(12) United States Patent
Jutzi

(10) Patent No.: US 8,566,469 B2
(45) Date of Patent: Oct. 22, 2013

(54) METHOD AND SYSTEM FOR PREDICTING AND STREAMING CONTENT UTILIZING MULTIPLE STREAM CAPACITY

(75) Inventor: Curtis Jutzi, Lake Oswego, OR (US)

(73) Assignee: Intel Corporation, Santa Clara, CA (US)

( * ) Notice: Subject to any disclaimer, the term of this patent is extended or adjusted under 35 U.S.C. 154(b) by 1629 days.

(21) Appl. No.: 10/745,867

(22) Filed: Dec. 24, 2003

(65) Prior Publication Data

US 2005/0149975 A1    Jul. 7, 2005

(51) Int. Cl.
*G06F 15/16*    (2006.01)
(52) U.S. Cl.
USPC ............................ 709/231; 709/203; 709/226
(58) Field of Classification Search
USPC ................. 709/231, 201, 202, 203, 226, 227; 725/95, 86
See application file for complete search history.

(56) References Cited

U.S. PATENT DOCUMENTS

| | | | | |
|---|---|---|---|---|
| 5,867,205 A * | 2/1999 | Harrison | .......................... | 725/38 |
| 6,259,443 B1 * | 7/2001 | Williams, Jr. | ................. | 715/741 |
| 6,473,137 B1 * | 10/2002 | Godwin et al. | ............... | 348/725 |
| 6,519,011 B1 * | 2/2003 | Shendar | ........................ | 348/731 |
| 6,728,965 B1 | 4/2004 | Mao | | |
| 6,804,824 B1 * | 10/2004 | Potrebic et al. | ................. | 725/38 |
| 6,927,806 B2 * | 8/2005 | Chan | .............................. | 348/731 |
| 6,985,188 B1 | 1/2006 | Hurst, Jr. | | |
| 7,694,319 B1 * | 4/2010 | Hassell et al. | ................... | 725/34 |
| 2002/0067438 A1 * | 6/2002 | Baldock | ........................ | 348/731 |
| 2002/0138837 A1 * | 9/2002 | Fries et al. | ....................... | 725/55 |
| 2003/0110514 A1 * | 6/2003 | West et al. | ..................... | 725/134 |
| 2004/0001500 A1 * | 1/2004 | Castillo | ......................... | 370/437 |
| 2004/0003396 A1 * | 1/2004 | Babu | ............................... | 725/34 |
| 2004/0076191 A1 * | 4/2004 | Sundqvist et al. | ............. | 370/516 |
| 2004/0189879 A1 * | 9/2004 | Read | ............................. | 348/731 |
| 2004/0194134 A1 * | 9/2004 | Gunatilake et al. | ............ | 725/38 |
| 2004/0268406 A1 * | 12/2004 | Sparrell et al. | ................ | 725/116 |
| 2004/0268419 A1 * | 12/2004 | Danker et al. | ................. | 725/136 |
| 2005/0081244 A1 * | 4/2005 | Barrett et al. | .................... | 725/97 |
| 2007/0061023 A1 * | 3/2007 | Hoffberg et al. | ................ | 700/83 |
| 2009/0222875 A1 * | 9/2009 | Cheng et al. | .................. | 725/147 |

FOREIGN PATENT DOCUMENTS

| | | |
|---|---|---|
| EP | 1 107 601 | 6/2001 |
| KR | 2001-0060382 | 7/2001 |

OTHER PUBLICATIONS

PCT search Report dated Apr. 14, 2005.
PCT Written Opinion for PCT/US2004/042681.

* cited by examiner

*Primary Examiner* — Dhairya A Patel
(74) *Attorney, Agent, or Firm* — Blakely, Sokoloff, Taylor & Zafman LLP

(57) ABSTRACT

A method and system for a predicting and streaming content utilizing multiple stream capacity. The method includes receiving a selection to change to a different channel, streaming data associated with the different channel from a source to a buffer at a destination, predicting a next channel selection based on the different channel, and streaming data associated with the predicted next channel selection from the source to another buffer at the destination.

32 Claims, 4 Drawing Sheets

METHOD AND SYSTEM FOR PREDICTING AND STREAMING CONTENT UTILIZING MULTIPLE STREAM CAPACITY

BACKGROUND

1. Technical Field

Embodiments of the invention relate to the field of streaming content with a device that has multiple streaming capacity, and more specifically to a predictive method of streaming content utilizing multiple stream capacity.

2. Background Information and Description of Related Art

When streaming content from a source to a destination utilizing a packet switching network which is not isochronous, implementations typically buffer data at the destination to allow for some level of jitter due to the non-isochronous delivery. When the client at the destination decides to change their selection of a channel, there is typically some delay due to the flushing of the current client side buffers and the buffering up of the new stream of data for the new channel before the new data may be presented. This delay will typically occur each time the client changes to another channel selection.

BRIEF DESCRIPTION OF DRAWINGS

The invention may best be understood by referring to the following description and accompanying drawings that are used to illustrate embodiments of the invention. In the drawings.

DETAILED DESCRIPTION

Embodiments of a system and method for a predicting and streaming content utilizing multiple stream capacity are described. In the following description, numerous specific details are set forth. However, it is understood that embodiments of the invention may be practiced without these specific details. In other instances, well-known circuits, structures and techniques have not been shown in detail in order not to obscure the understanding of this description.

Reference throughout this specification to "one embodiment" or "an embodiment" means that a particular feature, structure, or characteristic described in connection with the embodiment is included in at least one embodiment of the invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
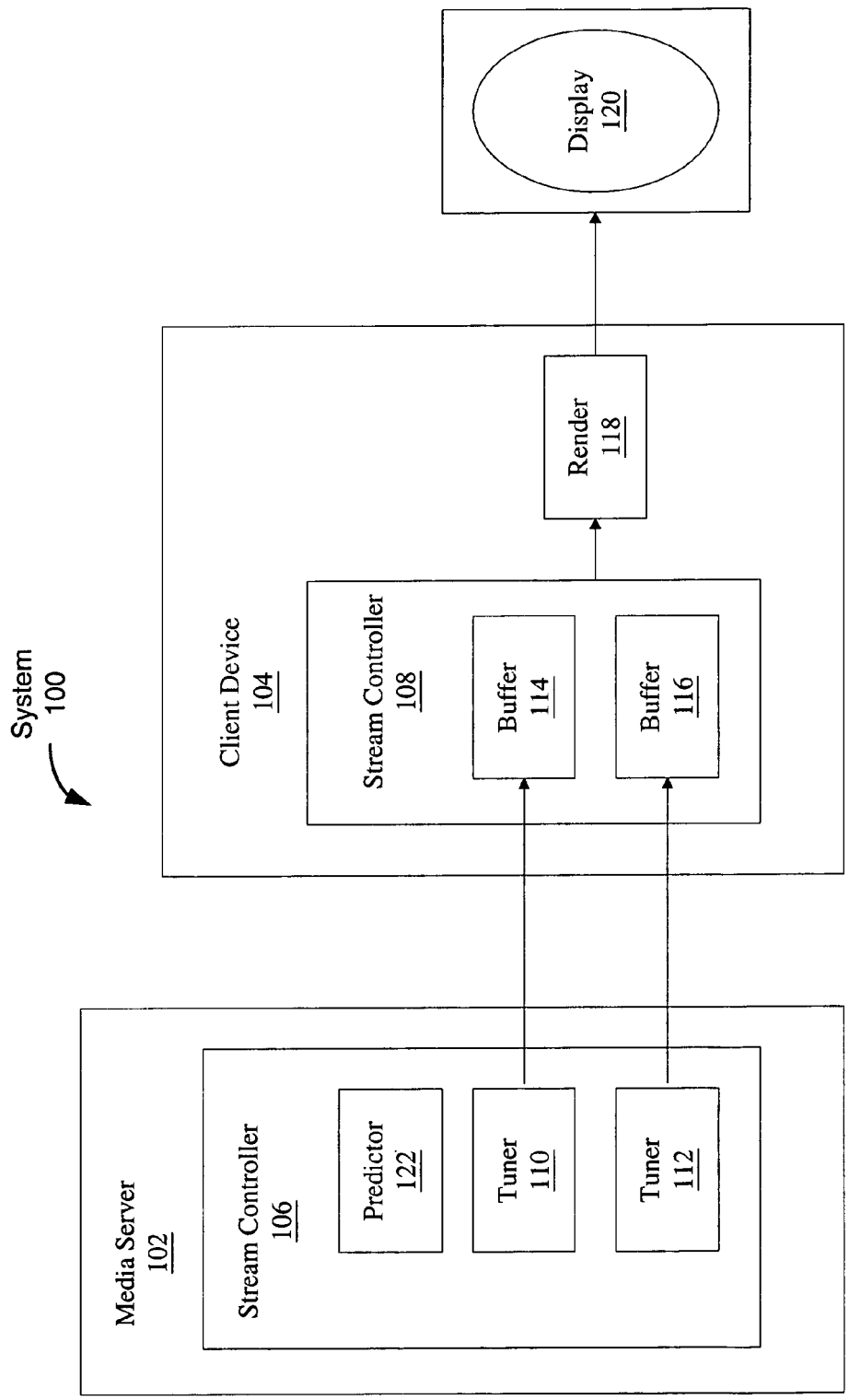
FIG. 1 is a block diagram illustrating one generalized embodiment of a system incorporating the invention.

Referring to FIG. 1, a block diagram illustrates a system 100 according to one embodiment of the invention. Those of ordinary skill in the art will appreciate that the system 100 may include more components than those shown in FIG. 1. However, it is not necessary that all of these generally conventional components be shown in order to disclose an illustrative embodiment for practicing the invention. In one embodiment, one or more components of system 100 may be part of a set-top box.

System 100 includes a media server 102 and a client device 104, which each include a stream controller. Stream controller 106 in media server 102 includes a plurality of tuners, such as 110 and 112, to tune to selected or predicted channels, and a predictor 122 to predict a next channel to be selected. Stream controller 108 includes a plurality of buffers, such as 114 and 116, to receive and store streams of data associated with selected or predicted channels from the tuners. The buffered data may then be rendered by rendering element 118. The rendered data may then be displayed on display device 120.

When an indication of a channel change is received, an available tuner in the media server 102 is tuned to the selected channel. Data associated with the selected channel is then streamed from the tuner to an available buffer in the client device 104. A prediction is made by predictor 122 as to the next channel to be selected. In one embodiment, the prediction may be based on the selected channel and/or one or more previously selected channels. In one embodiment, the prediction is based on the direction of the channel change. For example, if the channel change is from channel 3 to channel 4, the direction of change is up, so the predicted next channel to be selected is channel 5.

After the next channel to be selected is predicted, an available tuner tunes to the predicted channel. Then, data associated with the predicted channel is streamed to an available buffer. Therefore, if the predicted channel is selected, the streamed data is already available in the buffer.

Whenever there is an available tuner and buffer, the available tuner may be tuned to a predicted channel and data associated with the predicted channel may be streamed to the available buffer for storage. In this way, the data associated with the predicted channel is ready in the buffer when the predicted channel is selected. The buffered data may then be accessed and rendered for display without further delay.

Figure 2:
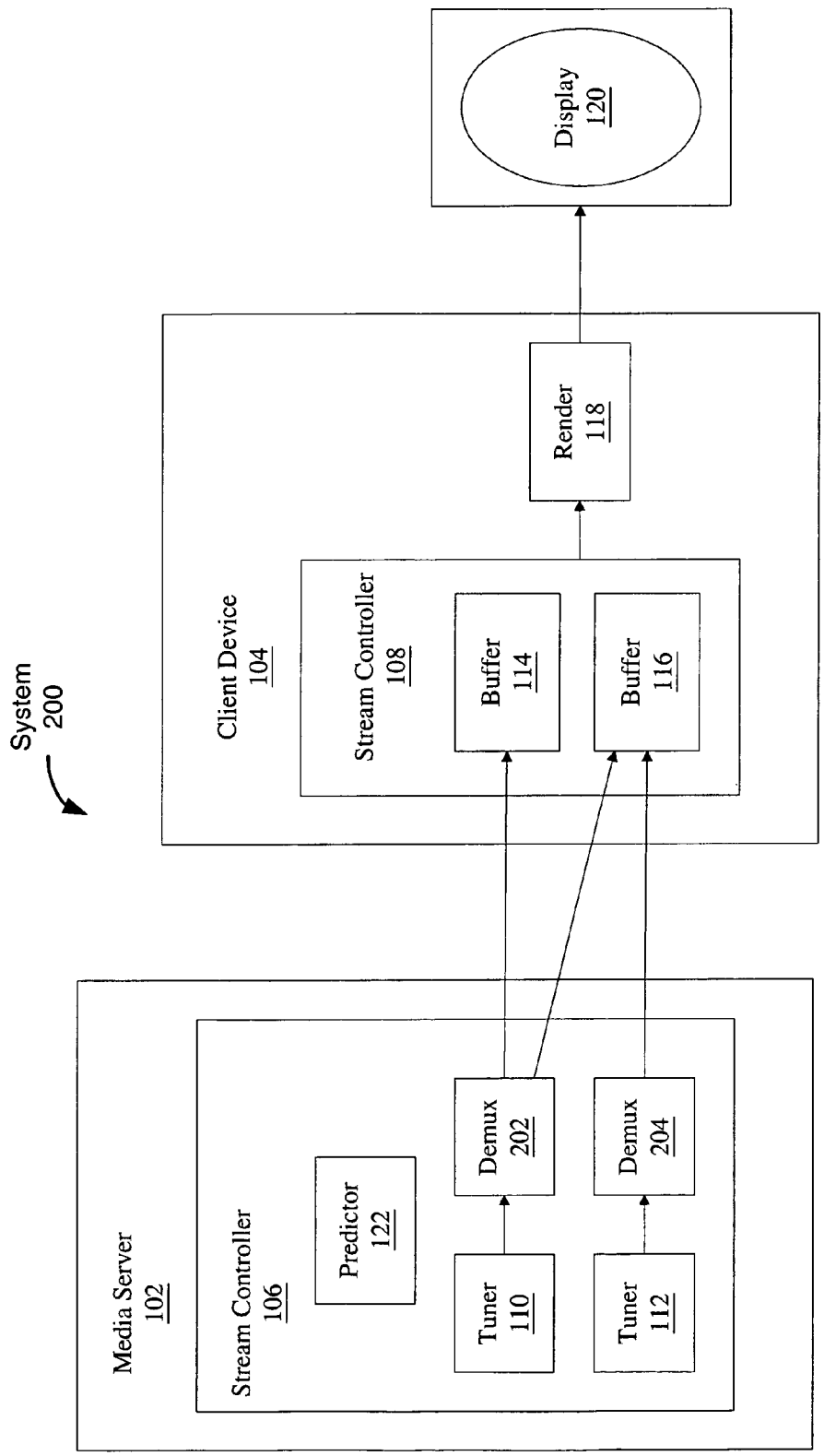
FIG. 2 is a block diagram illustrating another generalized embodiment of a system incorporating the invention.

FIG. 2 is a block diagram illustrating a system 200 according to another embodiment of the invention. System 200 is similar to system 100, with the addition of one or more demultiplexers (DEMUX), such as 202 or 204, to select one of multiple streams of data from a tuner based on a selected or predicted channel. For example, in a satellite system, there may be more than one virtual channel within one set frequency domain, typically known as a transponder. In this case, instead of changing the tuner, a demultiplexer may be used to select the virtual channel, or stream, from a set of possible streams coming from the tuner. The selected data stream may then be transmitted to a buffer at the client device.

When there is a channel change, the demultiplexer may select the data stream associated with the selected channel and transmit that data stream to an available buffer. A next channel to be selected may then be predicted. In one embodiment, the prediction may be based on the selected channel and/or one or more previously selected channels. In one embodiment, the prediction may be based on the direction of the channel change. A demultiplexer may select the data stream associated with the predicted channel and transmit that data stream to an available buffer. That way, if the predicted channel is selected, the data associated with the predicted channel is ready in the buffer. The data may then be rendered and displayed without further delay.

Figure 3:
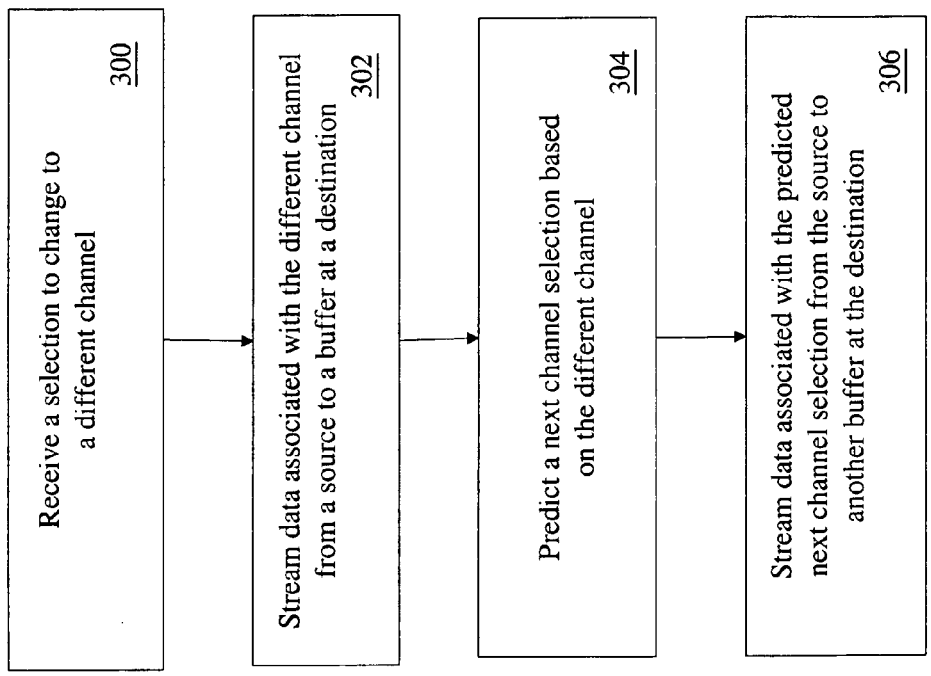
FIG. 3 is a flow diagram illustrating a method according to an embodiment of the invention.

FIG. 3 illustrates a method according to one embodiment of the invention. At 300, a selection to change to a different channel is received. In one embodiment, a tuner at a source is tuned to the different channel. In one embodiment, a demultiplexer selects one of multiple streams of data associated with the different channel from a tuner at the source. In one embodiment, the source is a media server. At 302, data associated with the different channel is streamed from the source to a buffer at a destination. In one embodiment, the destination is a client device. At 304, a next channel selection is predicted based on the selected different channel. In one embodiment, the next channel selection is predicted based on the direction of the channel selection change. In one embodiment, another tuner at the source is tuned to the predicted channel. In one embodiment, a demultiplexer selects a data stream associated with the predicted channel from multiple streams of data coming from a tuner at the source. At 306, data associated with the predicted channel is streamed from the source to another buffer at the destination.

In one embodiment, the stream of data associated with the selected different channel is rendered at the destination. The rendered data may then be displayed. In one embodiment, a selection to change to the predicted channel is received. Since the data associated with the predicted channel has already been streamed to a buffer at the destination, the data can be rendered without delay. The next channel selection may be predicted. An available tuner at the source may be tuned to the next channel selection or a demultiplexer at the source may select the data stream from the tuner associated with the next channel selection. Data associated with the next channel selection may then be streamed to an available buffer at the destination.

Figure 4:
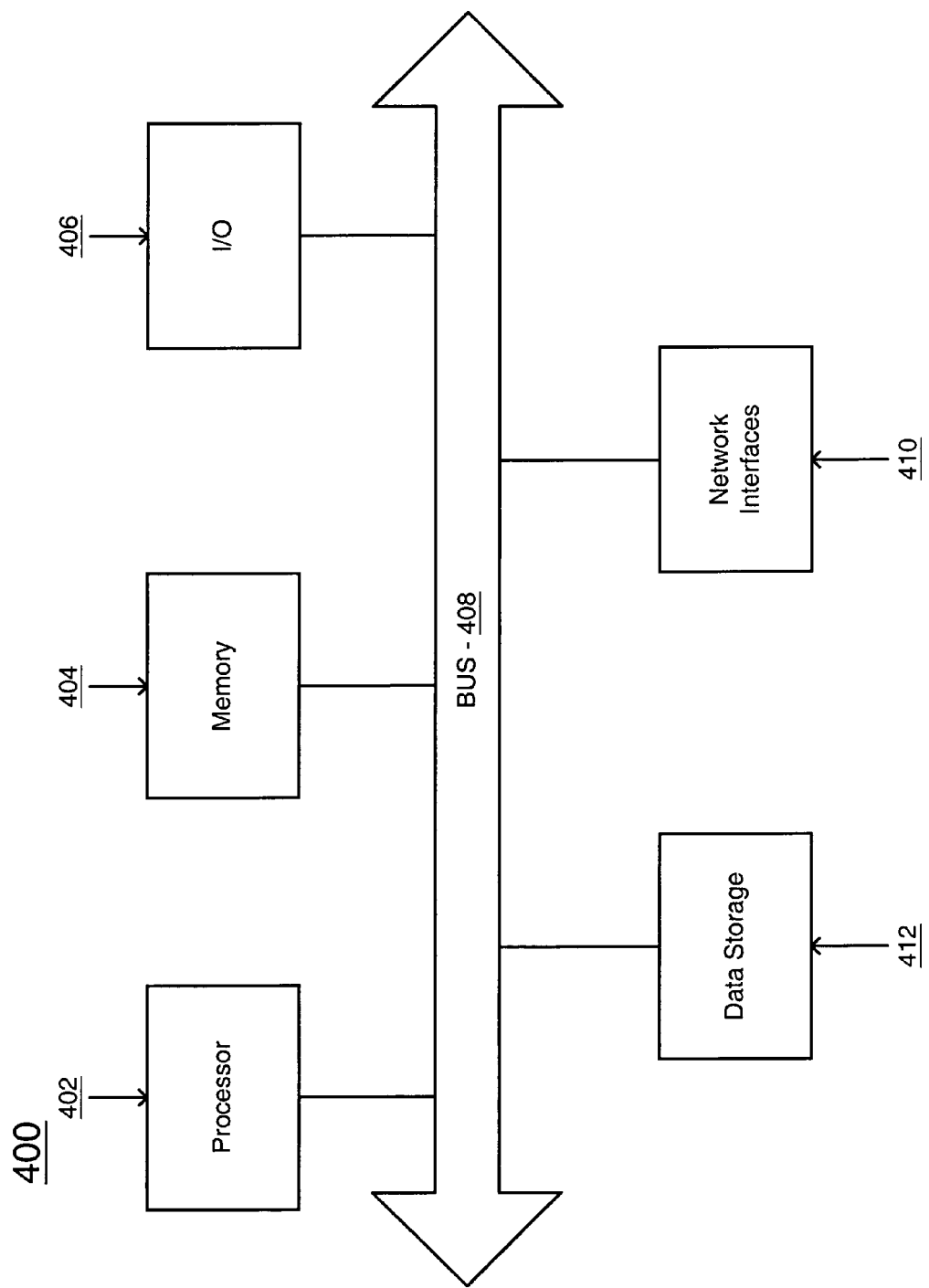
FIG. 4 is a block diagram illustrating a suitable computing environment in which certain aspects of the illustrated invention may be practiced.

FIG. 4 is a block diagram illustrating a suitable computing environment in which certain aspects of the illustrated invention may be practiced. In one embodiment, the method described above may be implemented on a computer system 400 having components 402-412, including a processor 402, a memory 404, an Input/Output device 406, a data storage device 412, and a network interface 410, coupled to each other via a bus 408. The components perform their conventional functions known in the art and provide the means for implementing the system 100. Collectively, these components represent a broad category of hardware systems, including but not limited to general purpose computer systems and specialized packet forwarding devices. It is to be appreciated that various components of computer system 400 may be rearranged, and that certain implementations of the present invention may not require nor include all of the above components. Furthermore, additional components may be included in system 400, such as additional processors (e.g., a digital signal processor), storage devices, memories, and network or communication interfaces.

As will be appreciated by those skilled in the art, the content for implementing an embodiment of the method of the invention, for example, computer program instructions, may be provided by any machine-readable media which can store data that is accessible by system 100, as part of or in addition to memory, including but not limited to cartridges, magnetic cassettes, flash memory cards, digital video disks, random access memories (RAMs), read-only memories (ROMs), and the like. In this regard, the system 100 is equipped to communicate with such machine-readable media in a manner well-known in the art.

It will be further appreciated by those skilled in the art that the content for implementing an embodiment of the method of the invention may be provided to the system 100 from any external device capable of storing the content and communicating the content to the system 100. For example, in one embodiment of the invention, the system 100 may be connected to a network, and the content may be stored on any device in the network.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
receiving at a server from a client device, a selection to change to a prior selected different channel;
allocating a first tuner of the plurality of tuners at the server to the prior selected different channel, wherein the server has the first tuner and a second tuner;
streaming data associated with the prior selected different channel from the first tuner at the server to a first buffer at the client device via a network;
predicting at the server a predicted next channel at the client based on the prior selected different channel;
allocating a second tuner at the server to the predicted next channel;
streaming data associated with the predicted next channel from the second tuner at the server via the network to a second buffer at the client device, wherein streaming the data associated with the predicted next channel occurs during streaming the data associated with the prior selected different channel; then
receiving at the server from the client device, a prior selection to change to the predicted next channel;
switching the first tuner to the predicted the next channel;
streaming data associated with the predicted the next channel from the first tuner at the server to the first buffer at the client device via the network;
predicting at the server an additional predicted next channel at the client based on the predicted next channel;
switching the second tuner at the server to the additional predicted next channel; and
streaming data associated with the additional predicted next channel from the second tuner at the server via the network to the second buffer at the client device, wherein streaming the data associated with the additional predicted next channel occurs during streaming the data associated with the predicted next channel.

2. The method of claim 1, further comprising rendering the data stream associated with the prior selected different channel at the client device.

3. The method of claim 2, further comprising providing the rendered data to a display coupled to the client device.

4. The method of claim 1, further comprising rendering the data stream stored in the second buffer associated with the predicted next channel.

5. The method of claim 1, further comprising predicting another channel selection and tuning an available tuner at the server to the another channel selection.

6. The method of claim 5, further comprising streaming data associated with the another channel selection to an available buffer at the client device.

7. The method of claim 1, wherein predicting the predicted next channel selection comprises predicting a next channel selection based on the direction of the channel change.

8. The method of claim 1, wherein predicting at the server the predicted next channel at the client is based on a direction of channel change at the client, the channel change including the selection to change to the prior selected different channel, further comprising receiving at the server from the client, a selection to change to the predicted next channel.

9. The method of claim 1, wherein receiving a selection comprises receiving at the server, a prior selection by a user to change to a different channel number of video presentation at the client; and wherein predicting at the server comprises predicting at the server a future selection by the user of a next channel number of video presentation at the client.

10. The method of claim 1, wherein the client is part of a set-top box and the server is a media server.

11. An apparatus comprising:
a processor;
a predictor at a computer server to predict a next channel to be selected in the future based on one or more received prior selected channel selections at a computer client device;
a first tuner at the server to tune to a selected channel of the prior selected channel selections to stream a first data stream associated with the selected channel to a first buffer at the client device via a network, the first buffer to store the first data stream associated with the selected channel received from the first tuner via the network;
a second tuner at a server to tune to the next channel to stream a second data stream associated with the next channel to a second buffer at the client device via the network, the second buffer at the client device to store the second data stream associated with the next channel received from the second tuner at the server via the network;
wherein streaming the data associated with the next channel to be selected occurs during streaming the data associated with the selected channel;
the first tuner to tune to the next channel to stream a third data stream associated with the next channel to the client device via the network based on receiving a prior selection to change to the next channel at the server from the client device;
the first buffer to store the third data stream associated with the next channel received from the first tuner via the network;
the predictor to predict an additional selected channel selection of an additional next channel at the client based on the next channel;
the second tuner to tune to the additional next channel; and
the second buffer to receive data associated with the additional next channel from the second tuner at the server via the network.

12. The apparatus of claim 11, further comprising a rendering element coupled to the buffers to select between the buffers and to render the buffered data for display when a channel is selected.

13. The apparatus of claim 12, further comprising a display device coupled to the rendering element to display the rendered data.

14. The apparatus of claim 11, wherein the tuners are part of a media server.

15. The apparatus of claim 11, wherein the buffers are part of a client device.

16. The apparatus of claim 11, wherein the predictor at the server predicts the next channel based on a direction of channel change at the client device, the channel change including the one or more received channel selections, wherein the server receives from the client, a selection to change to the predicted next channel.

17. The apparatus of claim 11, wherein the predictor predicts at the computer server, a next channel number of video presentation to be selected by a user in the future at the computer client device, based on a prior selection by a user to change to a different channel number of video presentation.

18. The apparatus of claim 11, wherein the client is part of a set-top box and the server is a media server.

19. An article of manufacture comprising:
a machine accessible non-transitory medium including content that when accessed by a machine causes the machine to perform operations comprising:
receiving a selection to change to a prior selected different channel at a server from a client device; tuning a first tuner at the server to the prior selected different channel, wherein tuning comprises selecting via a demultiplexer one of multiple streams of data from a tuner at the server that is associated with the prior selected different channel;
streaming data associated with the prior selected different channel from the server to a first buffer at the client device via a network, wherein streaming data associated with the prior selected different channel includes transmitting the selected stream of data from the demultiplexer to the first buffer at the client device;
predicting at the server a future selection of a next channel at the client based on the prior selected different channel;
tuning a second tuner at the server to the predicted next channel and streaming the data associated with the predicted next channel from the second tuner at the server to a second buffer at the client device;
streaming data associated with the predicted next channel from the server via the network to the second buffer at the client device, wherein streaming the data associated with the predicted next channel occurs during streaming the data associated with the prior selected different channel;
predicting at the server an additional predicted next channel at the client based on the predicted next channel;
switching the second tuner at the server to the additional predicted next channel; and
streaming data associated with the additional predicted next channel from the second tuner at the server via the network to the second buffer at the client device, wherein streaming the data associated with the additional predicted next channel occurs during streaming the data associated with the predicted next channel.

20. The article of manufacture of claim 19, wherein the machine-accessible medium further includes content that causes the machine to perform operations comprising rendering the stream of data associated with the prior selected different channel at the client device.

21. The article of manufacture of claim 20, wherein the machine-accessible medium further includes content that causes the machine to perform operations comprising providing the rendered data to a display coupled to the client device.

22. The article of manufacture of claim 20, wherein the machine-accessible medium further includes content that causes the machine to perform operations comprising receiving a selection to change to the predicted next channel.

23. The article of manufacture of claim 22, wherein the machine-accessible medium further includes content that causes the machine to perform operations comprising rendering the stream of data from the second buffer associated with the predicted next channel.

24. The article and manufacture of claim 19, wherein predicting at the server the predicted next channel at the client is based on a direction of channel change at the client, the channel change including the selection to change to the prior selected different channel, further comprising receiving at the server from the client, a selection to change to the predicted next channel.

25. The article of manufacture of claim 19, wherein receiving a selection comprises receiving at the server, a selection by a user to change to a different channel number of video presentation at the client; and wherein predicting at the server comprises predicting at the server a future selection by the user of a next channel number of video presentation at the client.

26. The article of manufacture of claim 19, wherein the client is part of a set-top box and the server is a media server.

27. A system comprising:
a processor;
a predictor at a server apparatus to predict a next channel to be selected at a client apparatus in the future;
a plurality of tuners at the server to tune to one or more frequency domains, each frequency domain including multiple streams of data associated with a plurality of channels;
one or more demultiplexers at the server to select one of the multiple streams of data from one of the tuners associated with a prior selected channel and to select one of the multiple streams of data from one of the tuners associated with the next channel to stream the streams of data associated with the prior selected channel and the next channel via a network;
a plurality of buffers at a client device to receive streams of data associated with the prior selected or next channels from the demultiplexers via the network, wherein streaming the data associated with the next channel occurs during streaming the data associated with the prior selected channel;
one of the demultiplexers to select the next channel to stream a data stream associated with the next channel to the client device via the network based on receiving a prior selection to change to the next channel at the server from the client device; and
a buffer at the client to store the third data stream associated with the next channel received from the first tuner via the network;
the predictor to predict an additional next channel at the client based on the next channel;
the second tuner to tune to the additional next channel; and
the second buffer to receive data associated with the additional next channel from the second tuner at the server via the network.

28. The system of claim 27, further comprising a rendering element coupled to the buffers to select between the buffers and to render streams of data associated with selected channels.

29. The system of claim 28, further comprising a display device coupled to the rendering element to display the rendered data.

30. The system of claim 27, wherein the predictor at the server predicts the next channel based on a direction of channel change at the client, the channel change including the next channel to be selected, wherein the server receives from the client, a selection to change to the predicted next channel.

31. The system of claim 27, wherein the predictor predicts at the computer server, a next channel number of video presentation to be selected by a user in the future at the computer client device, based on a prior selection by a user to change to a different channel number of video presentation.

32. The system of claim 27, wherein the client is part of a set-top box and the server is a media server.

\* \* \* \* \*